US012731377B2

(12) United States Patent
Baker et al.

(10) Patent No.: US 12,731,377 B2
(45) Date of Patent: Sep. 8, 2026

(54) GENERATING TRAINING DATA SET FOR IMAGE CLASSIFICATION MACHINE LEARNING MODEL

(71) Applicant: The Boeing Company, Arlington, VA (US)

(72) Inventors: Anthony Wayne Baker, Gilbertsville, PA (US); Willaredt Hardy, San Francisco, CA (US)

(73) Assignee: The Boeing Company, Arlington, VA (US)

( * ) Notice: Subject to any disclaimer, the term of this patent is extended or adjusted under 35 U.S.C. 154(b) by 401 days.

(21) Appl. No.: 18/480,726

(22) Filed: Oct. 4, 2023

(65) Prior Publication Data

US 2025/0118050 A1 Apr. 10, 2025

(51) Int. Cl.

*G06V 10/764* (2022.01)
*G06T 7/00* (2017.01)
*G06V 10/25* (2022.01)
*G06V 10/46* (2022.01)
*G06V 10/75* (2022.01)
*G06V 20/70* (2022.01)

(52) U.S. Cl.

CPC .......... *G06V 10/764* (2022.01); *G06T 7/0008* (2013.01); *G06V 10/25* (2022.01); *G06V 10/462* (2022.01); *G06V 10/751* (2022.01); *G06V 20/70* (2022.01); *G06T 2207/20081* (2013.01); *G06T 2207/20084* (2013.01)

(58) Field of Classification Search

CPC ...... G06V 10/764; G06V 10/25; G06V 20/70; G06V 10/462; G06V 10/751; G06T 7/0008; G06T 2207/20081; G06T 2207/20084

USPC ........................................................ 382/224

See application file for complete search history.

(56) References Cited

PUBLICATIONS

Yang, Hua, et al. “Autolabeling-enhanced active learning for cost-efficient surface defect visual classification.” IEEE Transactions on Instrumentation and Measurement 70 (2021): 1-15. (Year: 2021).*

Keum, Ji-Soo, Hyon-Soo Lee, and Masafumi Hagiwara. “Mean shift-based sift keypoint filtering for region-of-interest determination.” The 6th International Conference on Soft Computing and Intelligent Systems, and The 13th International Symposium on Advanced Intelligence Systems. IEEE, 2012. (Year: 2012).*

* cited by examiner

*Primary Examiner* — Jonathan S Lee

(74) *Attorney, Agent, or Firm* — Alleman Hall LLP

(57) ABSTRACT

A computing system including one or more processing devices configured to receive a first labeled image set including first images that each include one or more first regions of interest. The one or more processing devices are further configured to receive an unlabeled image set including a plurality of second images, and to identify second regions of interest included in the second images. The one or more processing devices are further configured to compute feature similarity values between the second and first regions of interest, identify a subset of the second regions of interest that have feature similarity values above a predetermined similarity threshold, and apply respective second labels to those second regions of interest. The one or more processing devices are further configured to construct a second labeled image set and train an image classification machine learning model with a training data set that includes the labeled image sets.

20 Claims, 14 Drawing Sheets

24
26A
24
26A
24
26A
22

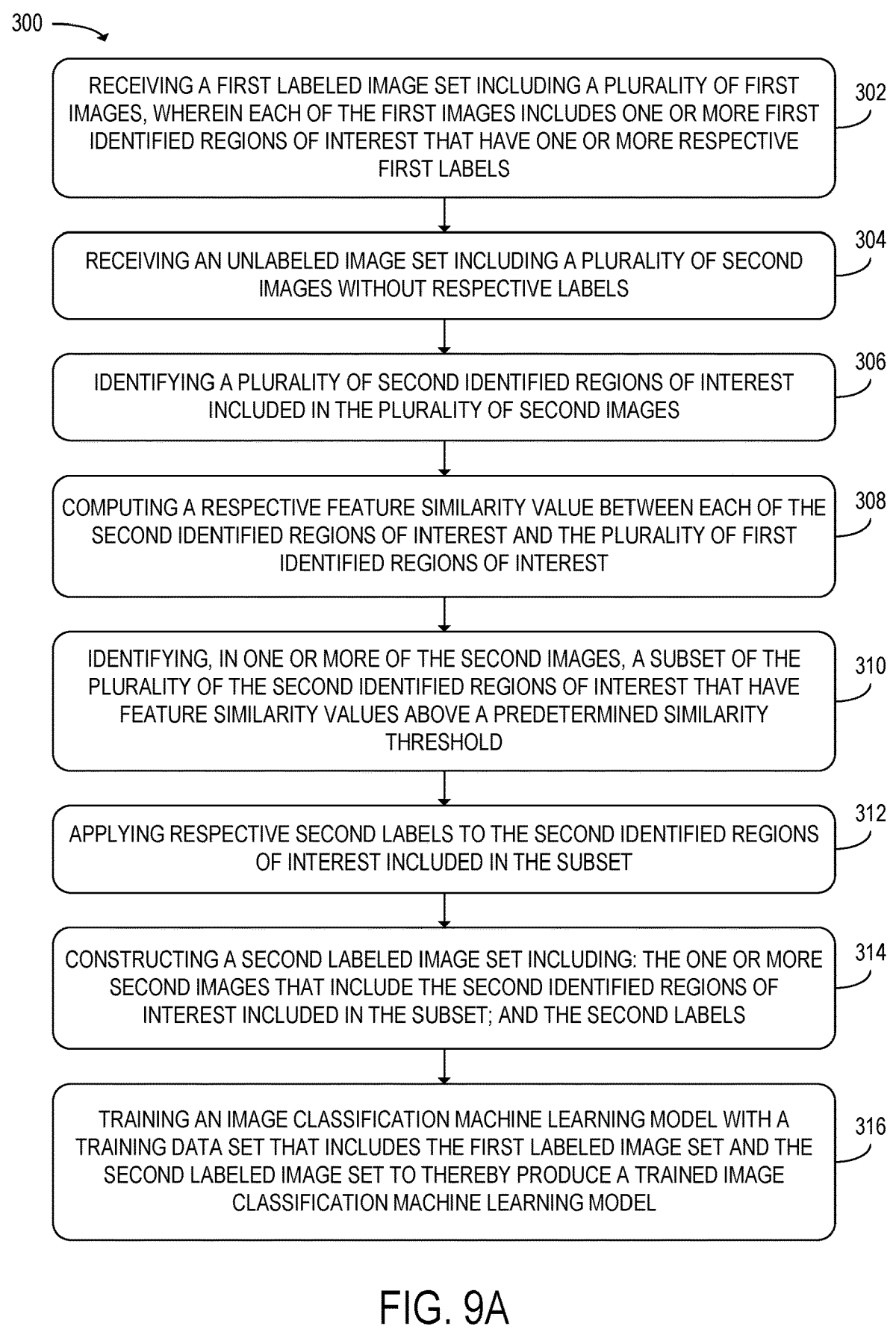

300

RECEIVING A FIRST LABELED IMAGE SET INCLUDING A PLURALITY OF FIRST IMAGES, WHEREIN EACH OF THE FIRST IMAGES INCLUDES ONE OR MORE FIRST IDENTIFIED REGIONS OF INTEREST THAT HAVE ONE OR MORE RESPECTIVE FIRST LABELS — 302

RECEIVING AN UNLABELED IMAGE SET INCLUDING A PLURALITY OF SECOND IMAGES WITHOUT RESPECTIVE LABELS — 304

IDENTIFYING A PLURALITY OF SECOND IDENTIFIED REGIONS OF INTEREST INCLUDED IN THE PLURALITY OF SECOND IMAGES — 306

COMPUTING A RESPECTIVE FEATURE SIMILARITY VALUE BETWEEN EACH OF THE SECOND IDENTIFIED REGIONS OF INTEREST AND THE PLURALITY OF FIRST IDENTIFIED REGIONS OF INTEREST — 308

IDENTIFYING, IN ONE OR MORE OF THE SECOND IMAGES, A SUBSET OF THE PLURALITY OF THE SECOND IDENTIFIED REGIONS OF INTEREST THAT HAVE FEATURE SIMILARITY VALUES ABOVE A PREDETERMINED SIMILARITY THRESHOLD — 310

APPLYING RESPECTIVE SECOND LABELS TO THE SECOND IDENTIFIED REGIONS OF INTEREST INCLUDED IN THE SUBSET — 312

CONSTRUCTING A SECOND LABELED IMAGE SET INCLUDING: THE ONE OR MORE SECOND IMAGES THAT INCLUDE THE SECOND IDENTIFIED REGIONS OF INTEREST INCLUDED IN THE SUBSET; AND THE SECOND LABELS — 314

TRAINING AN IMAGE CLASSIFICATION MACHINE LEARNING MODEL WITH A TRAINING DATA SET THAT INCLUDES THE FIRST LABELED IMAGE SET AND THE SECOND LABELED IMAGE SET TO THEREBY PRODUCE A TRAINED IMAGE CLASSIFICATION MACHINE LEARNING MODEL — 316

FIG. 9A

GENERATING TRAINING DATA SET FOR IMAGE CLASSIFICATION MACHINE LEARNING MODEL

FIELD

This application is related generally to image classification and more specifically to computing a training data set with which an image classification machine learning model is trained.

BACKGROUND

Machine-learning-based classifiers are used in a wide range of image processing tasks. Training machine learning models used in image classification typically relies on large sets of labeled data. However, when machine learning models are trained to perform image classification in niche domains, sets of labeled images large enough to use as training data sets are unlikely to be available. In addition, it is typically expensive and time-consuming to manually label large numbers of training images.

SUMMARY

According to one aspect of the present disclosure, a computing system is provided, including one or more processing devices configured to receive a first labeled image set including a plurality of first images. Each of the first images includes one or more first identified regions of interest that have one or more respective first labels. The one or more processing devices are further configured to receive an unlabeled image set including a plurality of second images without respective labels, and to identify a plurality of second identified regions of interest included in the plurality of second images. The one or more processing devices are further configured to compute a respective feature similarity value between each of the second identified regions of interest and the plurality of first identified regions of interest. The one or more processing devices are further configured to identify, in one or more of the second images, a subset of the plurality of the second identified regions of interest that have feature similarity values above a predetermined similarity threshold, and to apply respective second labels to the second identified regions of interest included in the subset. The one or more processing devices are further configured to construct a second labeled image set including the one or more second images that include the second identified regions of interest included in the subset. The second labeled image set further includes the second labels. The one or more processing devices are further configured to train an image classification machine learning model with a training data set that includes the first labeled image set and the second labeled image set to thereby produce a trained image classification machine learning model.

BRIEF DESCRIPTION OF THE DRAWINGS

FIG. 9A shows a flowchart of a method for use with a computing system to train an image classification machine learning model, according to the example of FIG. 2.

DETAILED DESCRIPTION

As discussed above, large training data sets of labeled images are frequently difficult to acquire in niche domains. Such domains include, for example, various quality-control classification tasks included in manufacturing processes. In such examples, the dimensions of classification for which a manufacturer wishes to train a classifier can be specific to a manufacturing step or type of manufacturing component. Preexisting sets of labeled images are therefore typically unavailable to use as training data sets for such classification tasks.

In order to address the above challenges, devices and methods are provided below for generating image classifier training data sets. Using such methods, a small sample of expert-labeled images can be used to guide automatic labeling of other images. Expert labeling, automated labeling, classifier training, and classifier testing can also be performed in an iterative loop to further reduce classifier error.

Figure 1A:
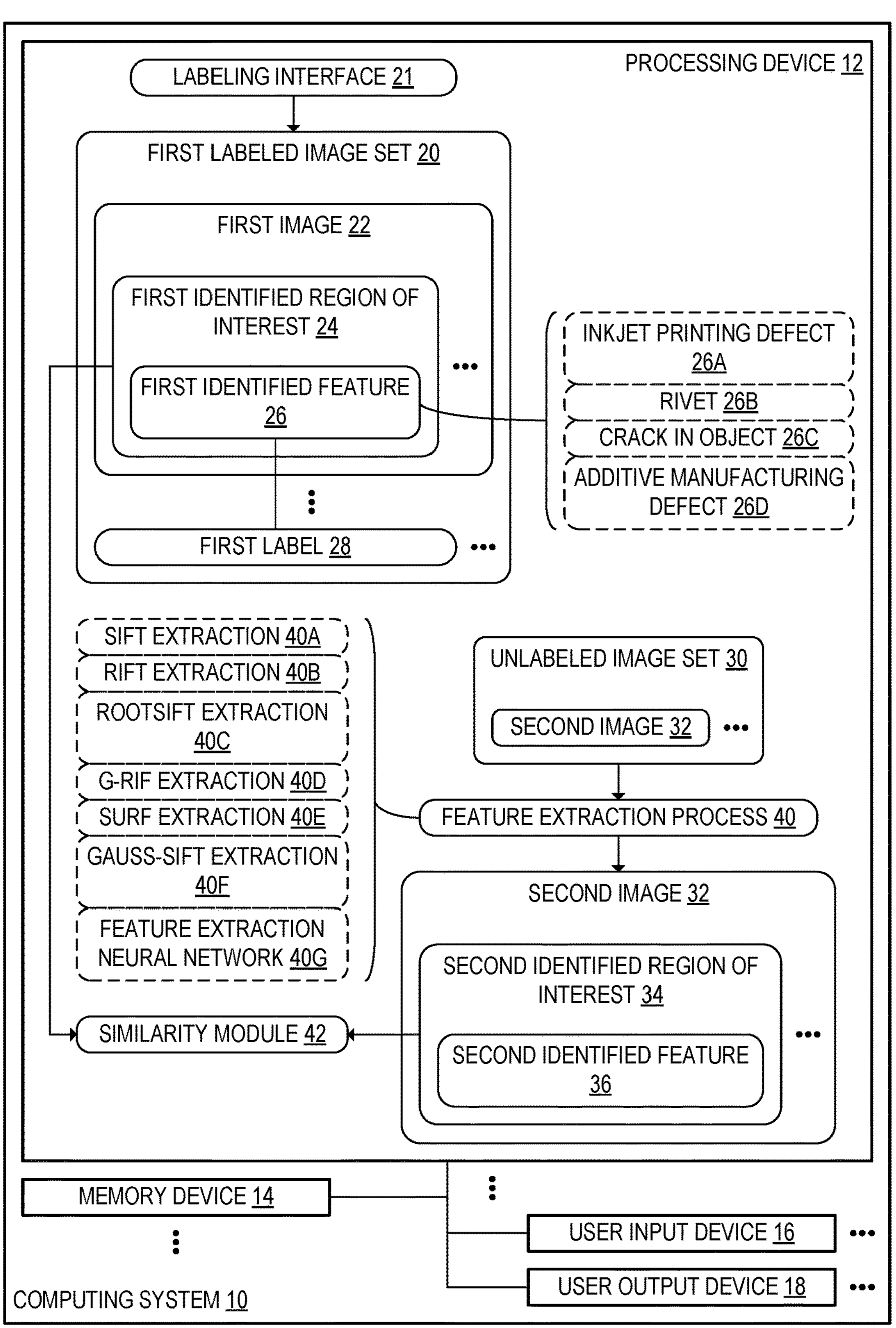
FIG. 1A schematically shows an example computing system including one or more processing devices configured to receive image data including a first labeled image set and an unlabeled image set, according to one example embodiment.

FIG. 1A schematically shows an example computing system 10 configured to receive image data, according to one example embodiment. The computing system 10 shown in FIG. 1 includes one or more processing devices 12 and one or more memory devices 14. The one or more processing devices 12 include, for example, one or more central processing units (CPUs), one or more graphics processing units (GPUs), and/or one or more other hardware accelerators. The one or more memory devices 14 include, for example, one or more volatile memory devices and one or more non-volatile storage devices. One or more user input devices 16 and one or more user output devices 18 are also included in the computing system 10 in some examples.

In some examples, the one or more processing devices 12 and the one or more memory devices 14 are included in one or more components that combine processor and memory functionality, such as a system-on-a-chip (SoC). Additionally or alternatively, in some examples, the one or more processing devices 12 and the one or more memory devices 14 are distributed across a plurality of physical computing systems, such as a plurality of networked computing devices located in a data center.

As depicted in the example of FIG. 1A, the one or more processing devices 12 are configured to receive a first labeled image set 20 including a plurality of first images 22. Each of the first images 22 includes one or more first identified regions of interest 24 that have one or more respective first labels 28. Thus, the first labeled image set 20 is a set of expert-labeled images in which the first identified regions of interest 24 are annotated with respective first labels 28 selected from among a set of object classes. In some examples, the first images 22 are received from a labeling interface 21 at which one or more users apply respective first labels 28 to the first identified regions of interest 24. The first identified regions of interest 24 are also specified by the one or more users in some examples, whereas in other examples, the first identified regions of interest 24 are selected using an automated feature extraction or image segmentation process.

Each of the first identified regions of interest 24 includes a respective first identified feature 26. For example, the first identified regions of interest 24 can include image data of inkjet printing defects 26A, rivets 26B, cracks in objects 26C, or additive manufacturing defects 26D as the first identified features 26. In such examples, the first labels 28 can indicate the presence or absence of such first identified features 26 within the first identified regions of interest 24. Other object classes describing the first identified features 26 are indicated in the first labeled image set 20 in other examples.

The one or more processing devices 12 are further configured to receive an unlabeled image set 30 including a plurality of second images 32 without respective labels. In addition, the one or more processing devices 12 are further configured to execute a feature extraction process 40 to identify a plurality of second identified regions of interest 34 included in the plurality of second images 32. For example, the feature extraction process 40 can be scale-invariant feature transform (SIFT) extraction 40A, rotation-invariant feature transform (RIFT) extraction 40B, RootSIFT extraction 40C, generalized robust invariant feature (G-RIF) extraction 40D, speeded up robust features (SURF) extraction 40E, or Gauss-SIFT extraction 40F. A feature extraction neural network 40G is alternatively used to perform the feature extraction process 40 in some examples. The second identified regions of interest 34 include a respective plurality of second identified features 36.

Figure 1B:
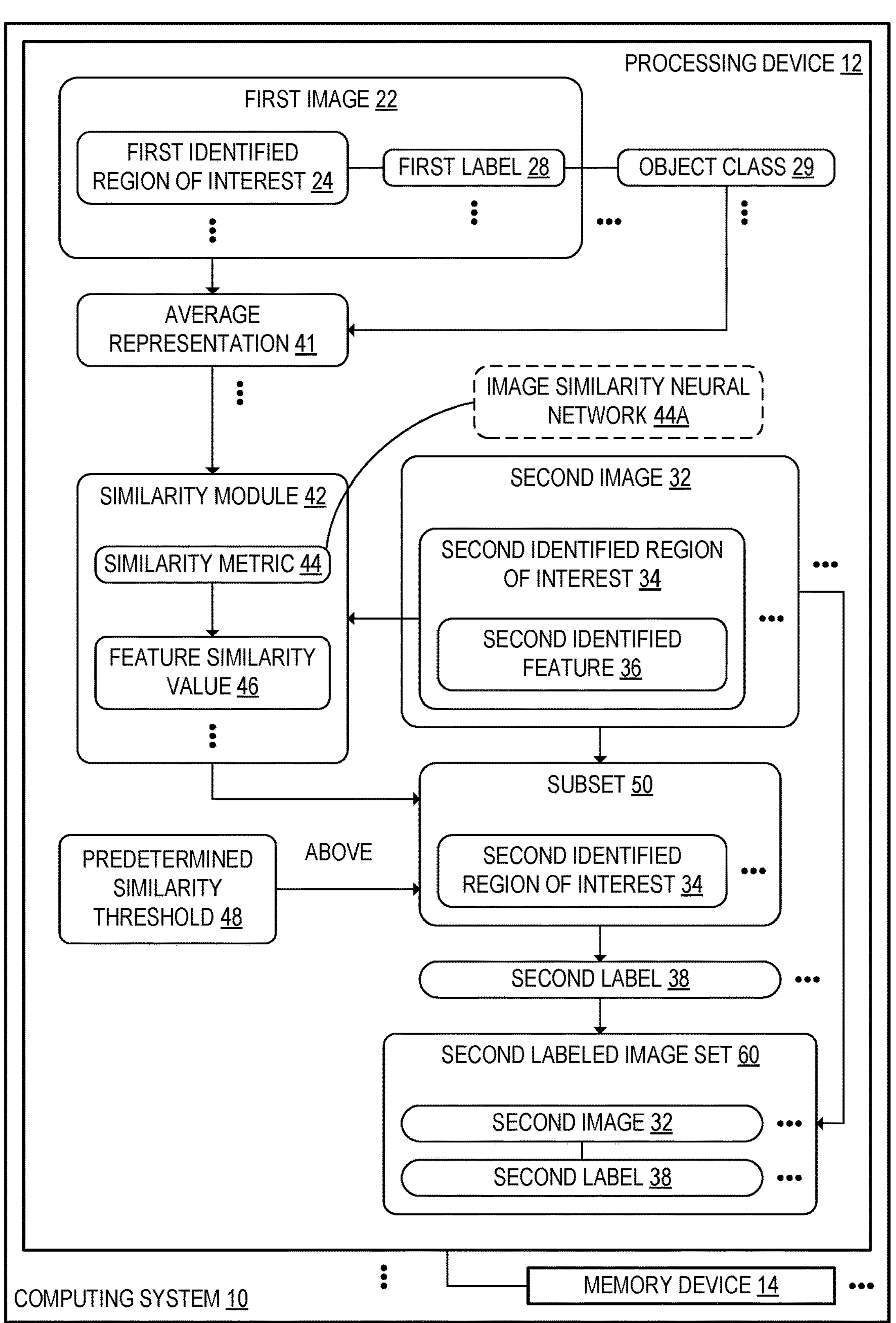
FIG. 1B schematically shows the computing system when the one or more processing devices are configured to execute a similarity module to compute feature similarity values, according to the example of FIG. 1A.

The one or more processing devices 12 are further configured to input the plurality of first identified regions of interest 24 and the plurality of second identified regions of interest 34 into a similarity module 42. FIG. 1B schematically shows the computing system 10 in further detail when the similarity module 42 is executed. At the similarity module 42, the one or more processing devices 12 are further configured to compute a respective feature similarity value 46 between each of the second identified regions of interest 34 and the plurality of first identified regions of interest 24. The feature similarity values 46 are each computed using a similarity metric 44. In some examples, the similarity metric 44 is an image similarity neural network 44A.

In some examples, prior to inputting the first identified regions of interest 24 into the similarity module 42, the one or more processing devices 12 are further configured to pre-process the first identified regions of interest 24 at least in part by averaging respective representations, as computed during feature extraction, of sets of first identified features 26 that share the same first label 28. Thus, the one or more processing devices 12 are further configured to compute a plurality of average representations 41 of respective object classes 29 indicated by the plurality of first labels 28. The one or more processing devices 12 are accordingly configured to compress clusters of the first identified features 26 that correspond to the different object classes 29. The one or more processing devices 12 are further configured to compute the feature similarity values 46 based at least in part on the average representations 41. This compression allows the similarity module 42 to compute the feature similarity values 46 between the second identified regions of interest 34 and the plurality of first identified regions of interest 24 more efficiently.

The one or more processing devices 12 are further configured to identify, in one or more of the second images 32, a subset 50 of the plurality of the second identified regions of interest 34 that have feature similarity values 46 above a predetermined similarity threshold 48. Having a feature similarity value 46 above the predetermined similarity threshold 48 indicates that a second identified region of interest 34 includes a second identified feature 36 that belongs to the same object class as one or more of the first identified features 26. Thus, the one or more processing devices 12 are further configured to apply respective second labels 38 to the second identified regions of interest 34 included in the subset 50. The second labels 38 match the respective first labels 28 of the first identified features 26 that the one or more processing devices 12 determine belong to the same object class as the second identified feature 36, as indicated by a feature similarity value 46 above the predetermined similarity threshold 48.

Figure 2:
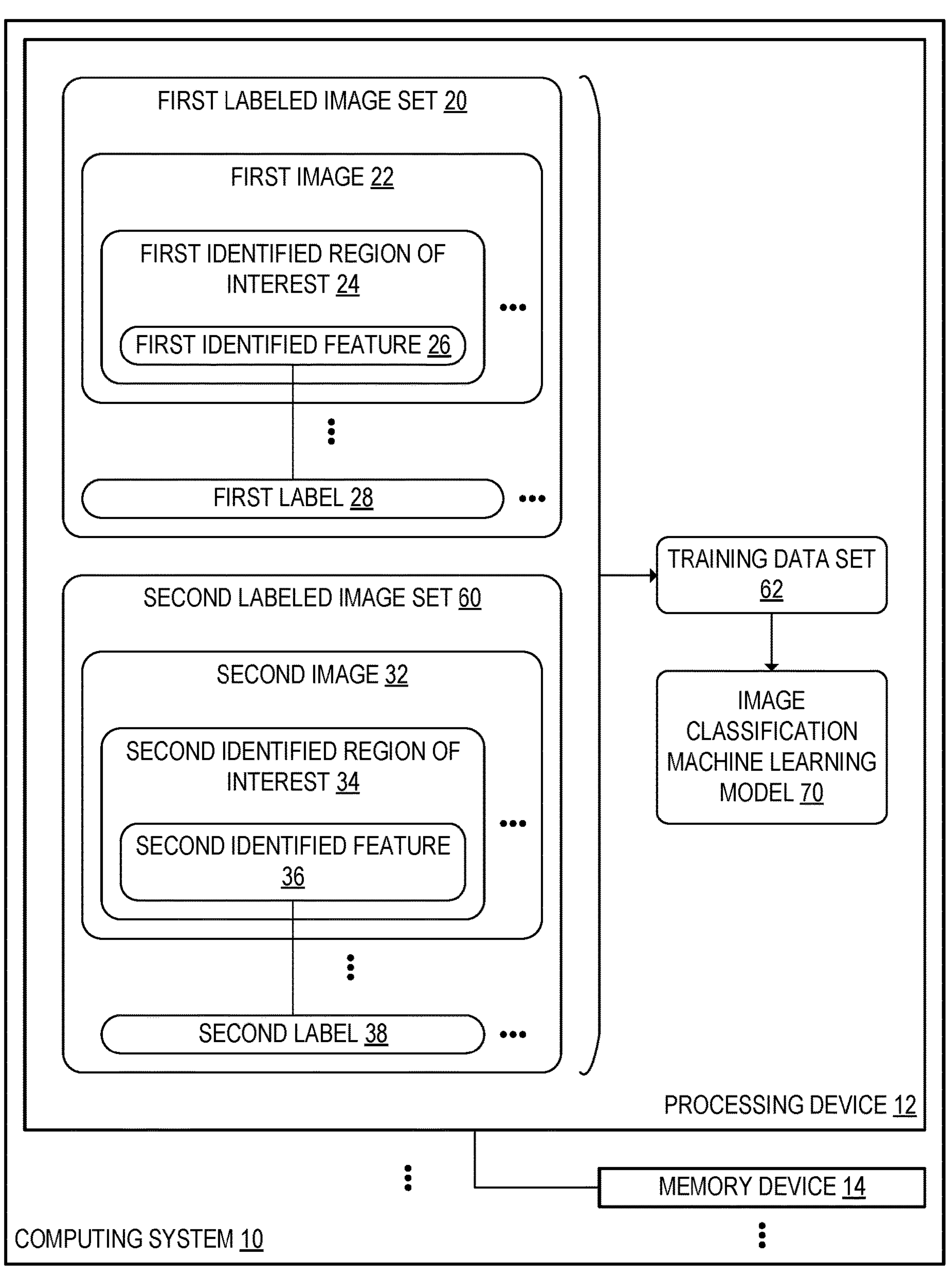
FIG. 2 schematically shows the computing system when the one or more processing devices are configured to train an image classification machine learning model using the first labeled image set and a second labeled image set, according to the example of FIGS. 1A-1B.

The one or more processing devices 12 are further configured to construct a second labeled image set 60, as depicted schematically in the example of FIG. 2. The second labeled image set 60 includes the one or more second images 32 that include the second identified regions of interest 34 included in the subset 50, along with the second labels 38 assigned to those second identified regions of interest 34.

Together, the first labeled image set 20 and the second labeled image set 60 form a training data set 62. Using the training data set 62, the one or more processing devices 12 are further configured to train an image classification machine learning model 70 to thereby produce a trained image classification machine learning model. The one or more processing devices 12 are accordingly configured to use both human-labeled and synthetically labeled images to train the image classification machine learning model 70.

Figure 3:
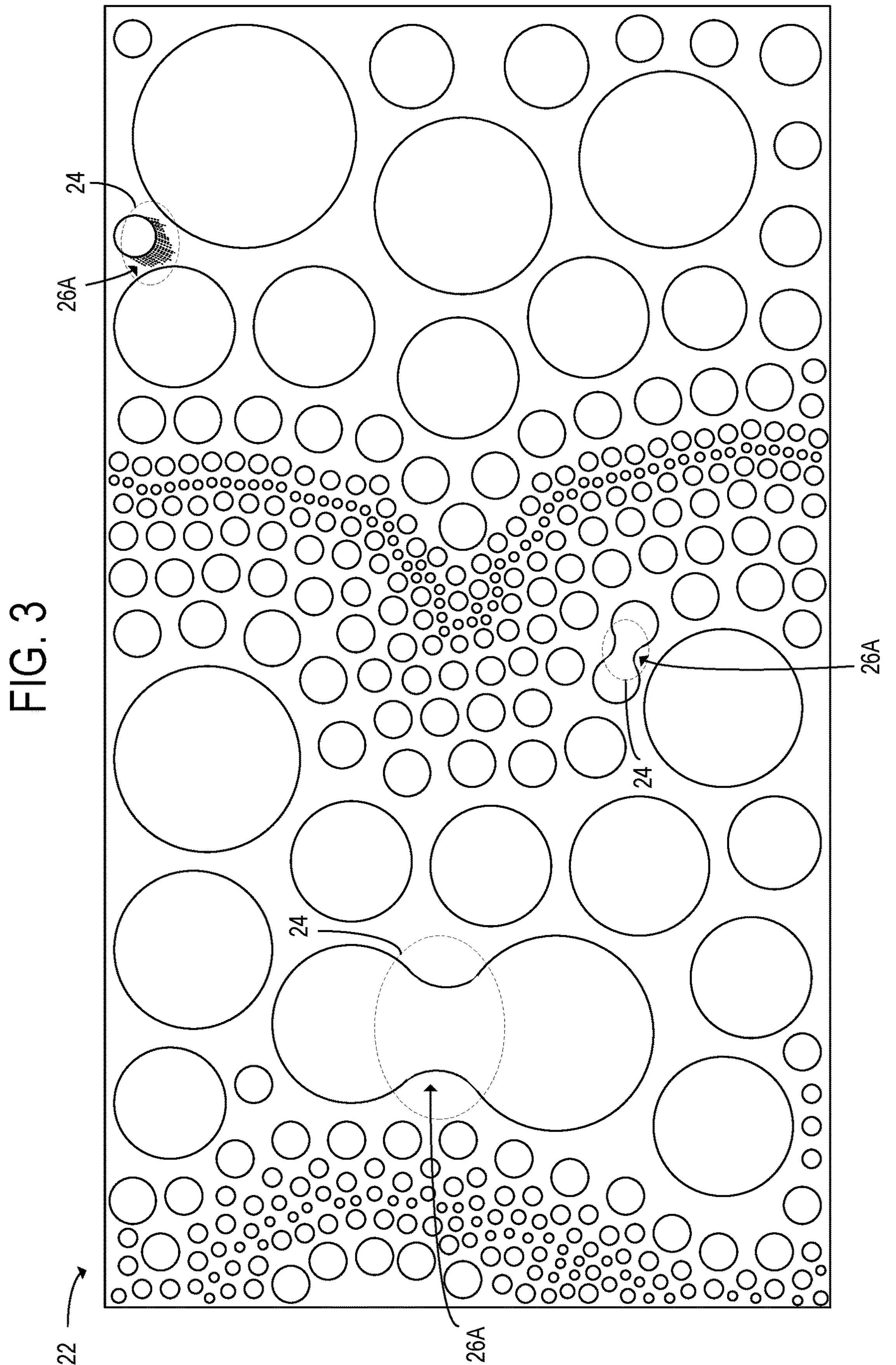
FIG. 3 shows an example first image including first identified regions of interest that include image data of inkjet printing defects, according to the example of FIGS. 1A-1B.

FIG. 3 shows an example first image 22. In the example of FIG. 3, the object classification task is identification of inkjet printing defects 26A. In the example first image 22, three first identified regions of interest 24 are shown. Each of these first identified regions of interest 24 includes image data showing a corresponding inkjet printing defect 26A. In this example, two of the inkjet printing defects 26A are merged ink drops and one of the inkjet printing defects 26A is a smudged ink drop.

Figure 4:
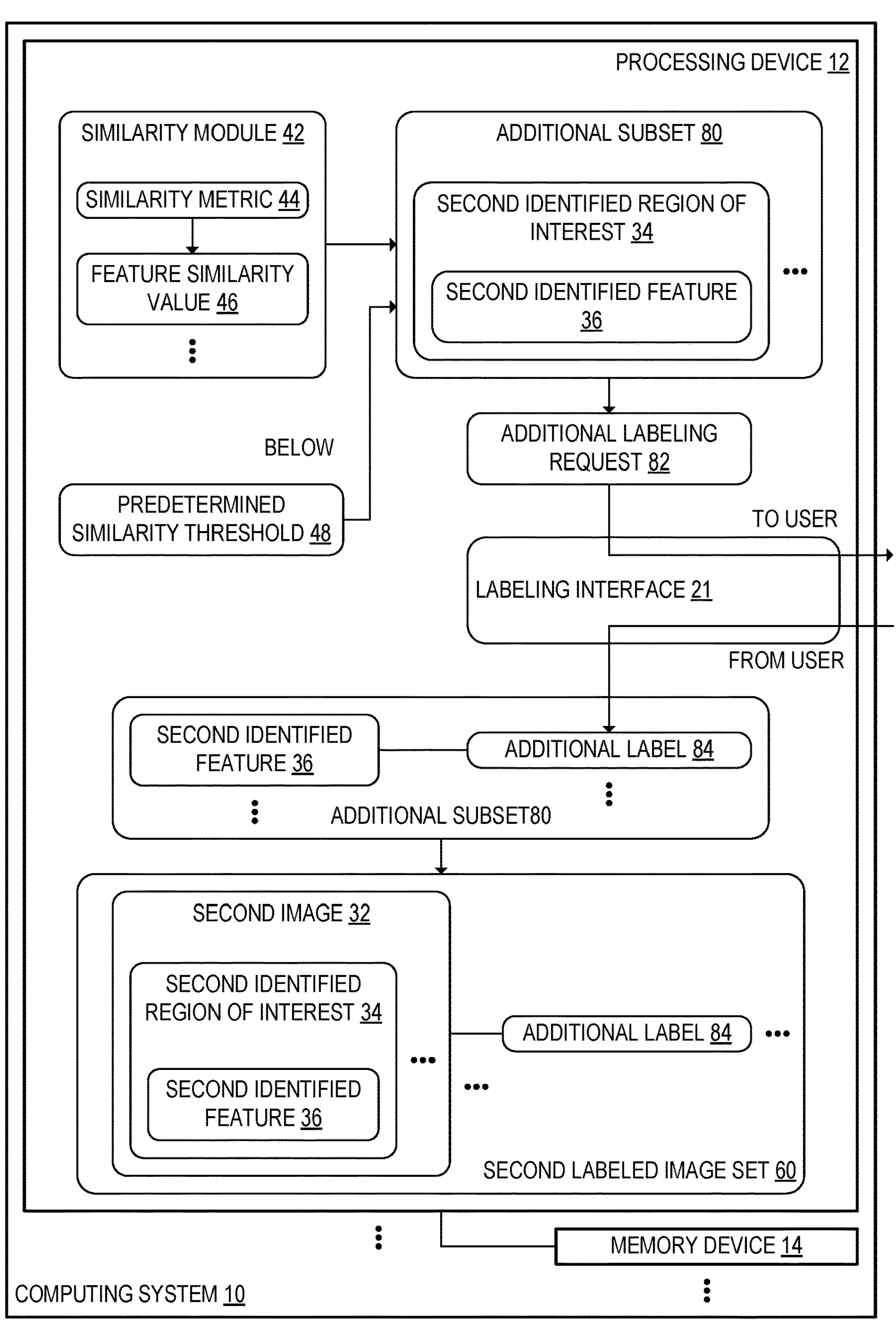
FIG. 4 schematically shows the computing system when the one or more processing devices are configured to request additional user markup of one or more images, according to the example of FIGS. 1A-1B.

In some examples, as shown in FIG. 4, the one or more processing devices 12 are further configured to request additional user markup for one or more of the second images 32. At the similarity module 42, the one or more processing devices 12 are further configured to identify an additional subset 80 of the plurality of second identified regions of interest 34 that have respective feature similarity values 46 below the predetermined similarity threshold 48. The low feature similarity values 46 indicate that the second identified regions of interest 34 included in the additional subset 80 are likely to be mislabeled. The one or more processing devices 12 are further configured to output an additional labeling request 82 to the user in response to determining that the feature similarity values 46 are below the predetermined similarity threshold 48. In the example of FIG. 4A, the additional labeling request 82 is transmitted to the user via the labeling interface 21.

In the example of FIG. 4, subsequently to outputting the additional labeling request 82, the one or more processing devices 12 are further configured to receive a plurality of additional labels 84 associated with the additional subset 80 of the plurality of second identified regions of interest 34. The plurality of additional labels 84 are also received via user input at the labeling interface 21 in the example of FIG. 4. The one or more processing devices 12 are further configured to apply the plurality of additional labels 84 to the second identified regions of interest 34 included in the additional subset 80. Accordingly, when computing the second labeled image set 60, the one or more processing devices 12 are configured to receive additional expert annotation of second identified regions of interest 34 that include image data of ambiguous second identified features 36.

Figure 5A:
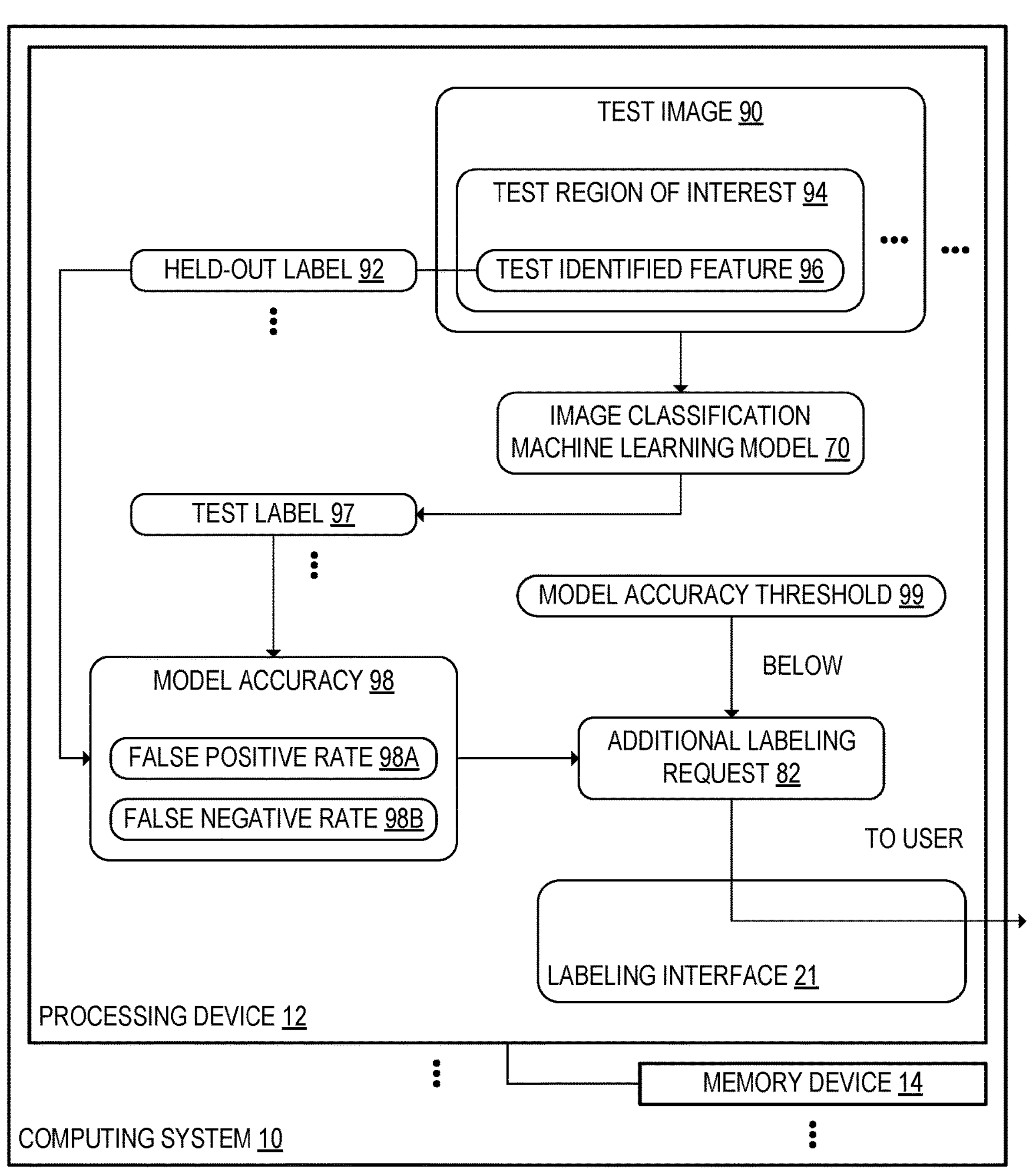
FIGS. 5A-5B schematically show the computing system during testing and additional training of the image classification machine learning model, according to the example of FIG. 2.
Figure 5B:
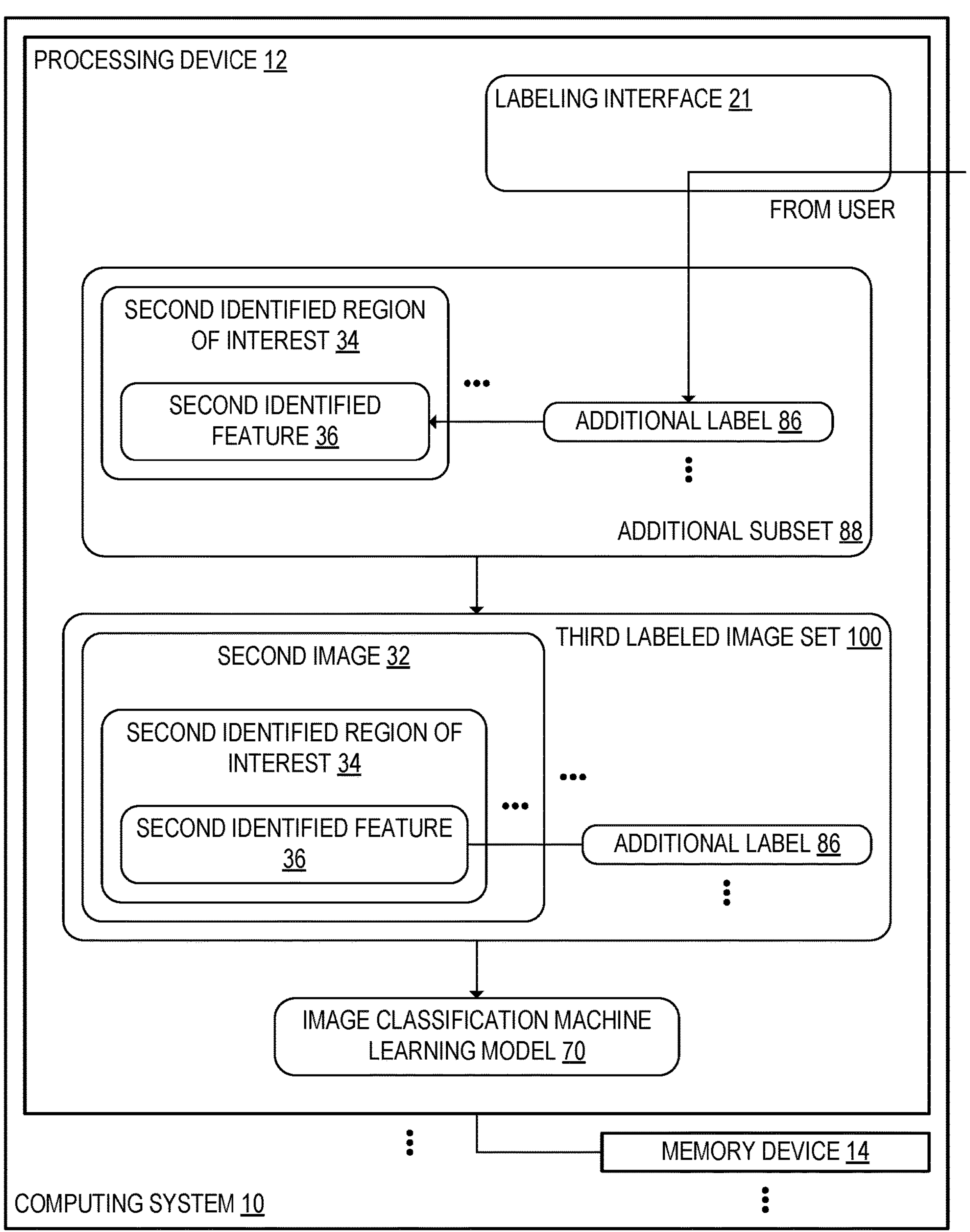

FIGS. 5A-5B schematically show the computing system 10 during testing of the image classification machine learning model 70. As depicted in the example of FIG. 5A, during a testing phase, the one or more processing devices 12 are further configured to receive a plurality of test images 90. The test images 90 are expert-labeled images that are held out of the training data set 62 during training of the image classification machine learning model 70. Each of the test images 90 includes one or more test regions of interest 94 that include image data of one or more respective test identified features 96. The one or more test identified features 96 are each associated with a respective held-out label 92.

At the image classification machine learning model 70, the one or more processing devices 12 are further configured to compute a plurality of test labels 97 respectively associated with the plurality of test regions of interest 94 included in the test images 90. The one or more processing devices 12 are further configured to compute a model accuracy 98 of the plurality of test labels 97 by comparing the test labels 97 to the held-out labels 92 assigned to the same test identified features 96. In some examples, as shown in FIG. 5A, computing the model accuracy 98 includes computing a false positive rate 98A and a false negative rate 98B of identifying a specific object class.

The one or more processing devices 12 are further configured to compare the model accuracy 98 of the image classification machine learning model 70 to a model accuracy threshold 99. When the one or more processing devices 12 determine that the model accuracy 98 is below the model accuracy threshold 99, the one or more processing devices 12 are further configured to output an additional labeling request 82 to the user. As in the example of FIG. 4, the one or more processing devices 12 shown in the example of FIG. 5A are configured to output the additional labeling request 82 to the user via the labeling interface 21.

As depicted in the example of FIG. 5B, the one or more processing devices 12 are further configured to receive a plurality of additional labels 86. The one or more processing devices 12 are further configured to apply the additional labels 86 to a plurality of second identified regions of interest 34 included in an additional subset 88 of the plurality of second images 32. Accordingly, the one or more processing devices 12 are configured to use the additional labels 86 to annotate a third labeled image set 100. The third labeled image set 100 includes a plurality of the second images 32 that include the second identified regions of interest 34 included in the additional subset 88. The third labeled image set 100 further includes the additional labels 86 assigned to those second identified regions of interest 34.

Subsequently to computing the third labeled image set 100, the one or more processing devices 12 are further configured to perform additional training at the image classification machine learning model 70 using the third labeled image set 100 as training data. The one or more processing devices 12 are accordingly configured to perform an additional round of training when the performance of the image classification machine learning model 70 is low, as indicated by a model accuracy 98 below the model accuracy threshold 99. The one or more processing devices 12 are configured to perform multiple such rounds of additional training in some examples in which the model accuracy 98 remains below the model accuracy threshold 99. Each of those additional rounds of training includes an additional markup round in which the one or more processing devices 12 receive additional labels 86, thereby increasing the amount of human-labeled training data over the course of the plurality of additional rounds of training.

Figure 6:
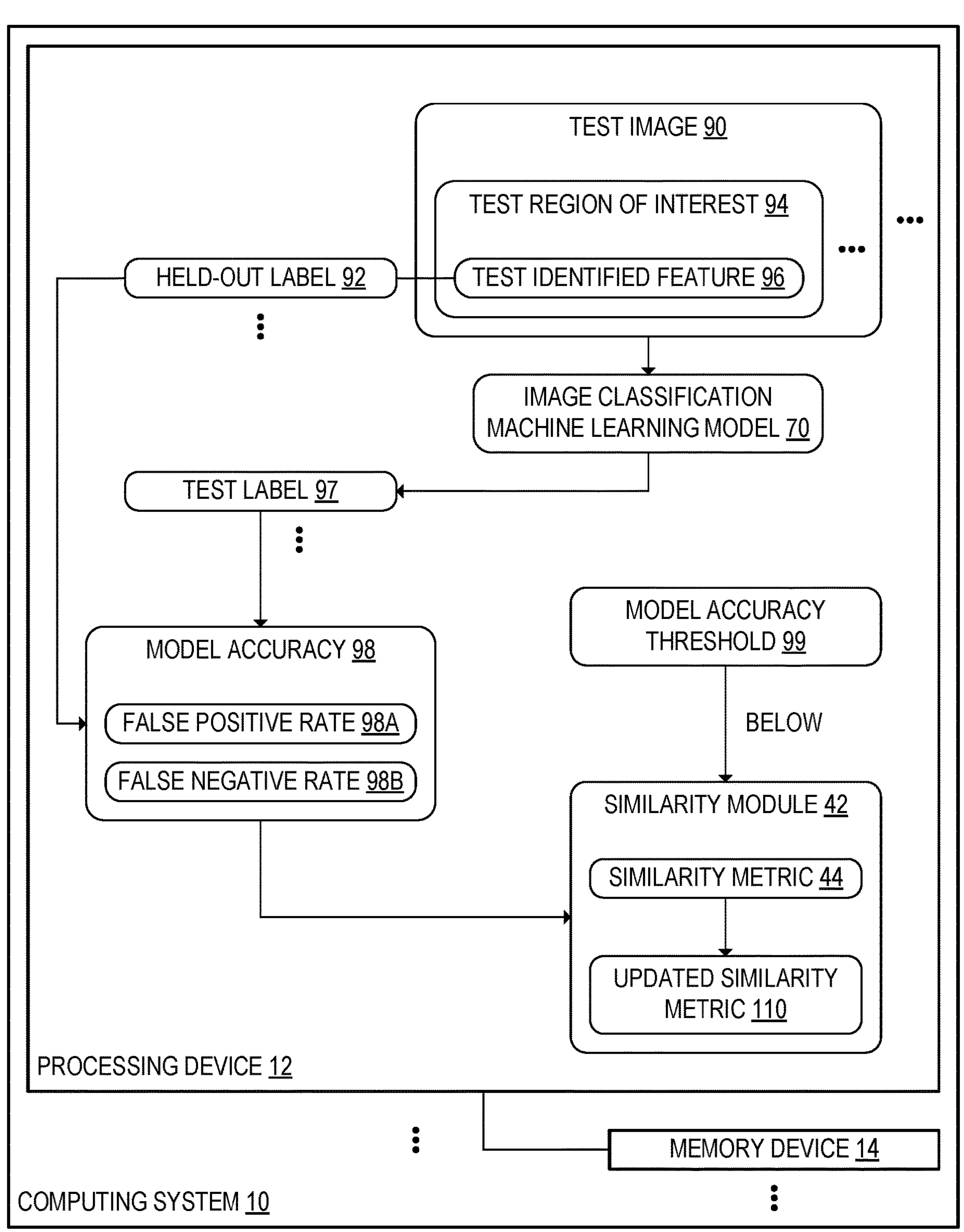
FIG. 6 schematically shows the computing system during testing of the image classification machine learning model in an example in which the one or more processing devices are configured to modify a similarity metric, according to the example of FIG. 2.

In some examples, additionally or alternatively to performing additional training with a third labeled image set 100, the one or more processing devices 12 are configured to modify the similarity metric 44 when iterative training and testing of the image classification machine learning model 70 is performed. FIG. 6 schematically shows the computing system 10 in an example in which the one or more processing devices 12 are configured to modify the similarity metric 44. In such examples, the one or more processing devices 12 are configured to receive a plurality of test images 90, compute a plurality of test labels 97, and compute a model accuracy 98 of the plurality of test labels 97, as in the example of FIG. 5A. The one or more processing devices 12 are further configured to determine that the model accuracy is below the model accuracy threshold 99.

In response to determining that the model accuracy 98 is below the model accuracy threshold 99, the one or more processing devices 12 are further configured to modify the similarity metric 44 with which the feature similarity values 46 are computed. Accordingly, the one or more processing devices 12 are configured to compute an updated similarity metric 110. For example, when the similarity metric 44 is an image similarity neural network 44A, the updated similarity metric 110 can be computed by performing additional training at the similarity neural network 44A. In some examples, the one or more processing devices 12 are configured to update the similarity metric 44 in response to determining that a ratio of the false positive rate 98A to the false negative rate 98B, or of the false negative rate 98B to the false positive rate 98A, is above a threshold.

Figure 7:
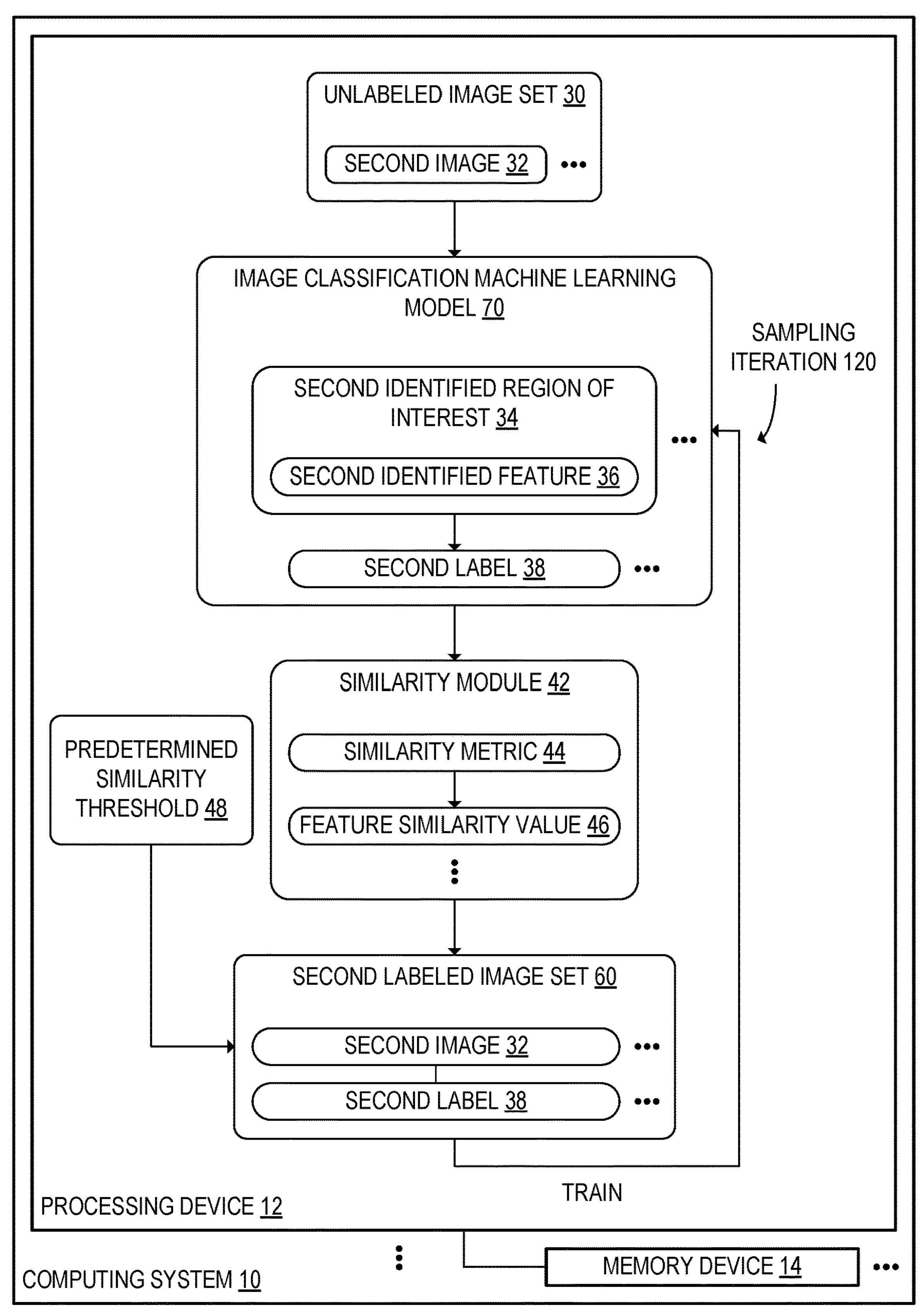
FIG. 7 schematically shows the computing system in an example in which the one or more processing devices are configured to identify second identified regions of interest using the image classification machine learning model, according to the example of FIG. 2.

In some examples, the image classification machine learning model 70 is trained to identify regions of interest as well as selecting classification labels. FIG. 7 schematically shows the computing system 10 in an example in which the one or more processing devices 12 are configured to identify the second identified regions of interest 34 using the image classification machine learning model 70. Thus, the image classification machine learning model 70 is trained to identify the second labels 38 directly from the second images 32 in the example of FIG. 7. The one or more processing devices 12 are further configured to compute respective feature similarity values 46 of the second labels 38 and to select a second labeled image set 60 including second images 32 with feature similarity values 46 above the predetermined similarity threshold 48, as discussed above.

In the example of FIG. 7, the one or more processing devices 12 are configured to perform a plurality of sampling iterations 120 that include iteratively re-selecting the second labeled image set 60 and further training the image classification machine learning model 70. Thus, the image classification machine learning model 70 is trained to both identify and assign second labels 38 to the second identified regions of interest 34. Over the plurality of sampling iterations 120, the feature similarity values between the second identified regions of interest 34 and the first identified regions of interest 24 trend upward as the accuracy of the image classification machine learning model 70 increases. Thus, by iteratively re-selecting the second labeled image set 60, the one or more processing devices 12 iteratively incorporate more second images 32 into the training data of the image classification machine learning model 70.

Figure 8:
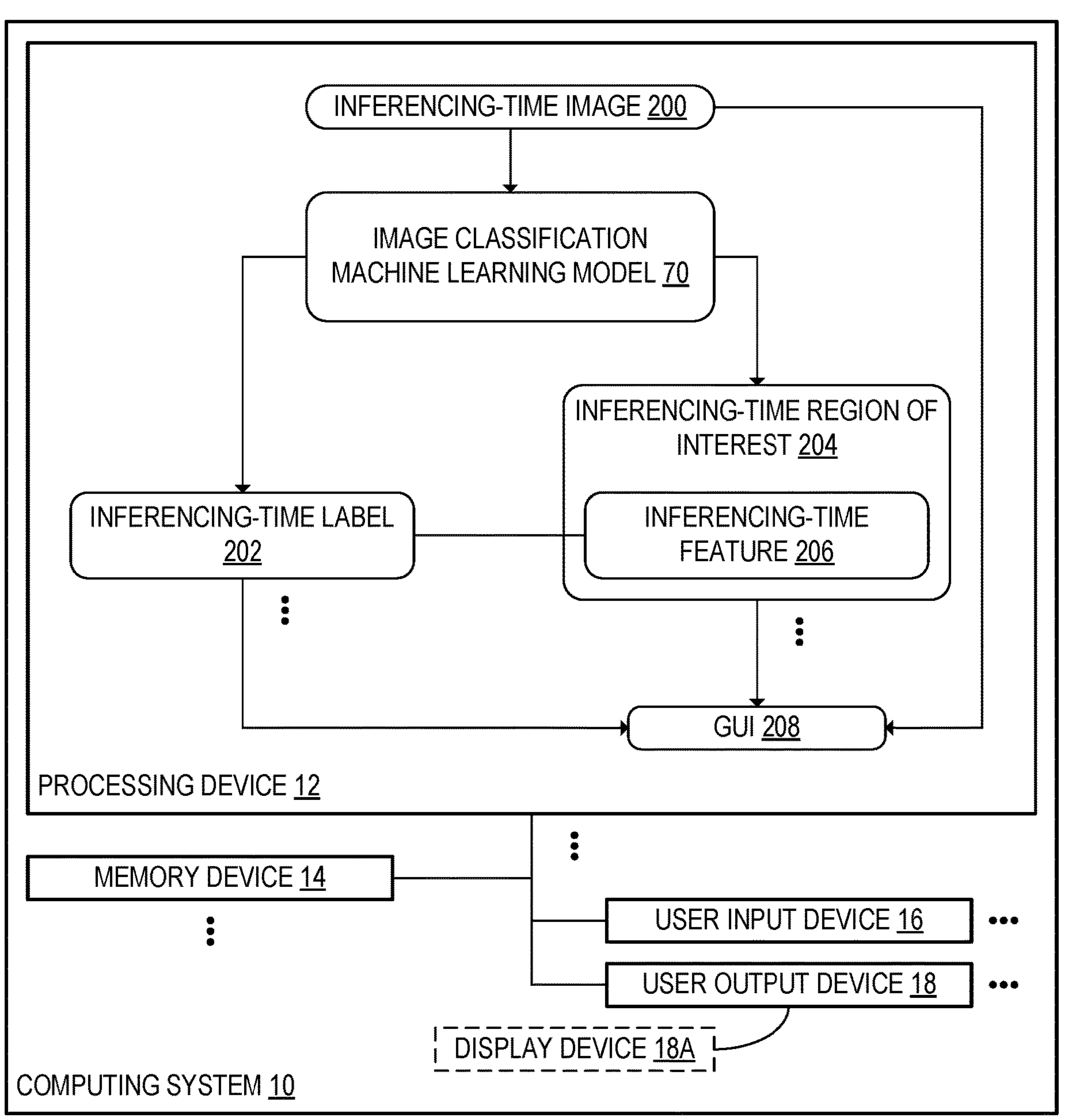
FIG. 8 schematically shows the computing system at inferencing time, according to the example of FIG. 2.

FIG. 8 schematically shows the computing system 10 at inferencing time, according to one example. As shown in FIG. 8, the one or more processing devices are further configured to receive an inferencing-time image 200. At the image classification machine learning model 70, the one or more processing devices 12 are further configured to compute one or more inferencing-time labels 202 respectively associated with one or more inferencing-time regions of interest 204 included in the inferencing-time image 200. The inferencing-time regions of interest 204 include image data of corresponding inferencing-time features 206 to which the image classification machine learning model 70 applies the inferencing-time labels 202.

The one or more processing devices 12 are further configured to output the one or more inferencing-time labels 202. In some examples, the one or more inferencing-time labels 202 are output to a graphical user interface (GUI) 208. The GUI 208 is displayed at a display device 18A included among the one or more user output devices 18. In the example of FIG. 8, the GUI 208 is further configured to display the inferencing-time image 200 with indications of the one or more inferencing-time regions of interest 204.

FIG. 9A shows a flowchart of a method 300 for use with a computing system to train an image classification machine learning model. At step 302, the method 300 includes receiving a first labeled image set including a plurality of first images. The first images included in the first labeled image set are expert-labeled images. Each of the first images includes one or more first identified regions of interest that have one or more respective first labels. The first identified regions of interest each include image data of a respective first identified feature, which is indicated with the corresponding first label of that first identified region of interest. In some examples, the first identified regions of interest include image data of inkjet printing defects, rivets, cracks in objects, or additive manufacturing defects.

The method 300 further includes, at step 304, receiving an unlabeled image set including a plurality of second images without respective labels. In addition, at step 306, the method 300 further includes identifying a plurality of second identified regions of interest included in the plurality of second images. The second identified regions of interest can be identified, for example, using SIFT extraction, RIFT extraction, RootSIFT extraction, G-RIF extraction, SURF extraction, Gauss-SIFT extraction, a feature extraction neural network, or some other technique for identifying regions of interest in an image. The second identified regions of interest include image data of a respective plurality of second identified features.

At step 308, the method 300 further includes computing a respective feature similarity value between each of the second identified regions of interest and the plurality of first identified regions of interest. In some examples, the feature similarity values are computed at an image similarity neural network. These feature similarity values are computed for multiple clusters of the plurality of first identified regions of interest in some examples, as discussed in further detail below.

At step 310, the method 300 further includes identifying, in one or more of the second images, a subset of the plurality of the second identified regions of interest that have feature similarity values above a predetermined similarity threshold. Thus, the second identified regions of interest included in the subset are indicated to be similar to the expert-labeled first identified regions of interest. At step 312, the method 300 further includes applying respective second labels to the second identified regions of interest included in the subset. Those second labels match the first labels of the first identified regions of interest that are similar to the second regions of interest, as indicated by the feature similarity values.

At step 314, the method 300 further includes constructing a second labeled image set. The second labeled image set includes the one or more second images that include the second identified regions of interest included in the subset. In addition, the second labeled image set includes the second labels applied to those second identified regions of interest.

At step 316, the method 300 further includes training an image classification machine learning model with a training data set that includes the first labeled image set and the second labeled image set. Thus, performing step 316 produces a trained image classification machine learning model trained on a combination of expert-labeled images and programmatically labeled images.

Figure 9B:
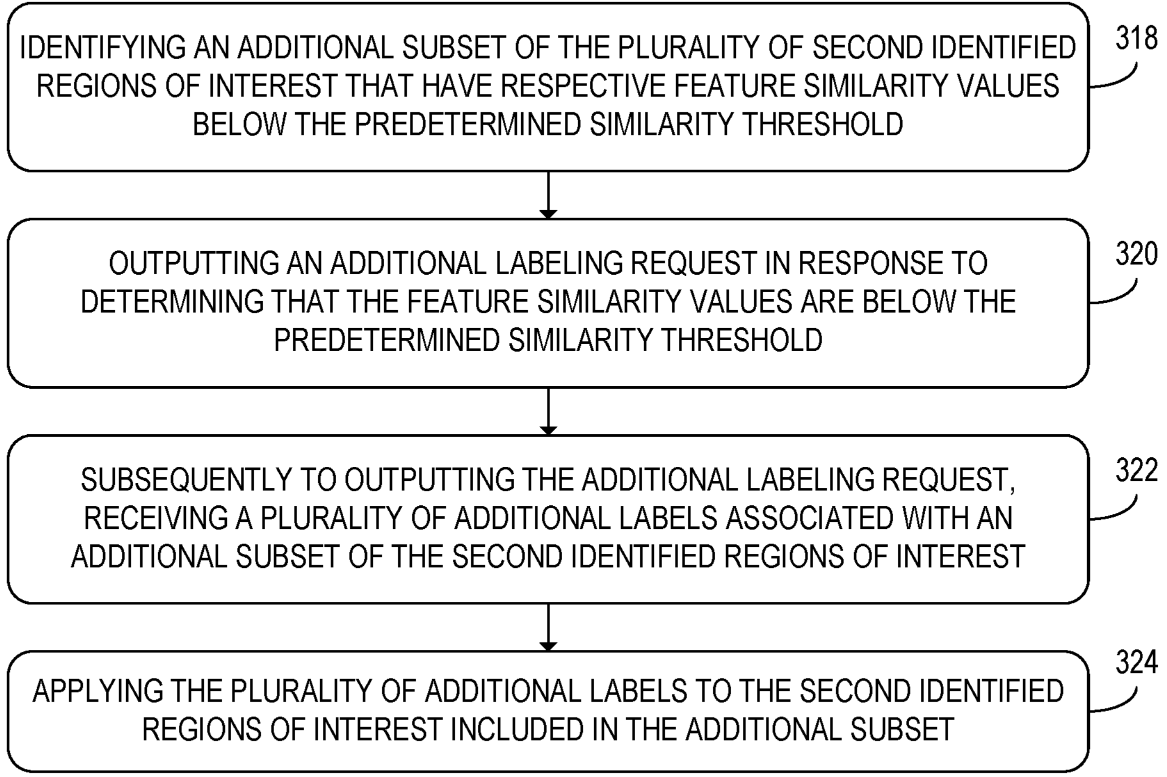
FIG. 9B shows additional steps of the method of FIG. 9A that are performed in some examples to construct a second labeled image set.

FIG. 9B shows additional steps that are performed in some examples to construct the second labeled image set. At step 318, the method 300 further includes identifying an additional subset of the plurality of second identified regions of interest that have respective feature similarity values below the predetermined similarity threshold. At step 320, the method 300 further includes outputting an additional labeling request in response to determining that the feature similarity values are below the predetermined similarity threshold. The additional labeling request is, in some examples, output to a labeling interface at which the second images are displayed to a user, and at which the user applies labels to the second regions of interest included in those images.

At step 322, subsequently to outputting the additional labeling request, the method 300 further includes receiving a plurality of additional labels associated with an additional subset of the second identified regions of interest. The method 300 further includes, at step 324, applying the plurality of additional labels to the second identified regions of interest included in the additional subset. Thus, using the steps shown in FIG. 9B, the computing system requests and receives additional expert markup for second identified regions of interest that are determined to be dissimilar to the expert-labeled first identified regions of interest.

Figure 9C:
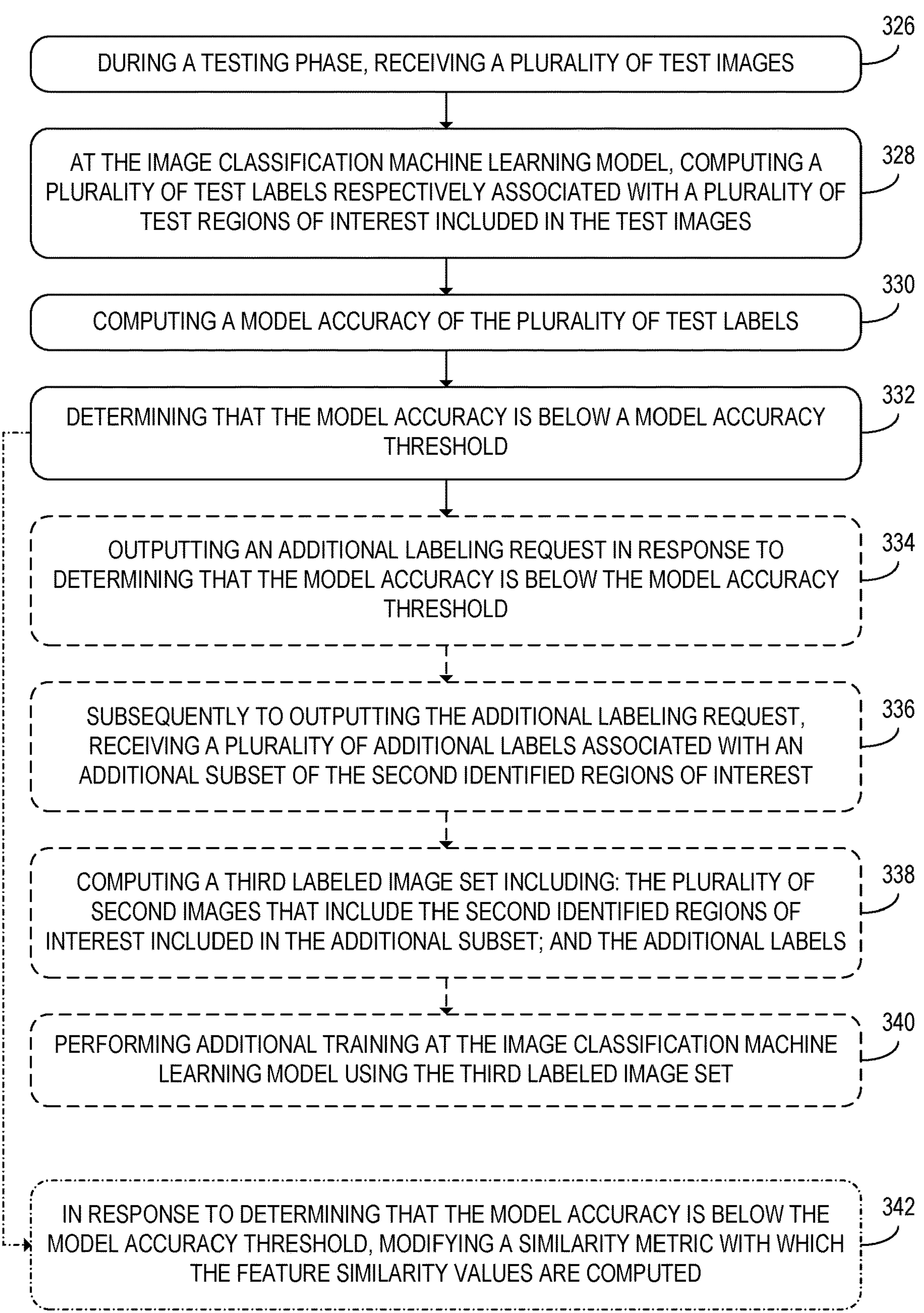
FIG. 9C shows additional steps of the method of FIG. 9A that are performed in some examples during testing of the image classification machine learning model.

FIG. 9C shows additional steps that are performed in some examples during testing of the image classification machine learning model. At step 326, the method 300 further includes receiving a plurality of test images during a testing phase. The test images are held-out expert-labeled images that each include one or more test regions of interest. The test regions of interest each include image data of a respective test identified feature to which a user has assigned a held-out label.

At step 328, the method 300 further includes computing a plurality of test labels at the image classification machine learning model. The test labels are respectively associated with the plurality of test regions of interest included in the test images.

At step 330, the method 300 further includes computing a model accuracy of the plurality of test labels. The model accuracy is computed by comparing the test labels to the held-out labels computed for the same test regions of interest. In some examples in which the image classification machine learning model is trained to identify whether a particular type of feature (e.g., a rivet) is present or absent in images, step 330 includes computing a false positive rate and a false negative rate of the image classification machine learning model. At step 332, the method 300 further includes determining that the model accuracy is below a model accuracy threshold.

In some examples, in response to determining that the model accuracy is below the model accuracy threshold, the method 300 further includes, at step 334, outputting an additional labeling request. Subsequently to outputting the additional labeling request in such examples, the method 300 further includes, at step 336, receiving a plurality of additional labels associated with an additional subset of the second identified regions of interest. Thus, the computing system receives expert markup for additional images.

The method 300 further includes, at step 338, computing a third labeled image set, which includes the plurality of second images that include the second identified regions of interest included in the additional subset. The third labeled image subset further includes the additional labels. At step 340, the method 300 further includes performing additional training at the image classification machine learning model using the third labeled image set. Training with additional expert-labeled images is therefore performed when the model accuracy is below the model accuracy threshold.

In some examples, rather than performing steps 334, 336, 338, and 340, the computing system is instead configured to perform step 342 subsequently to step 332. At step 342, in response to determining that the model accuracy is below the model accuracy threshold, the method 300 further includes modifying a similarity metric with which the feature similarity values are computed. For example, when the feature similarity values are computed with an image similarity neural network, additional training can be performed at the image similarity neural network.

Figure 9D:
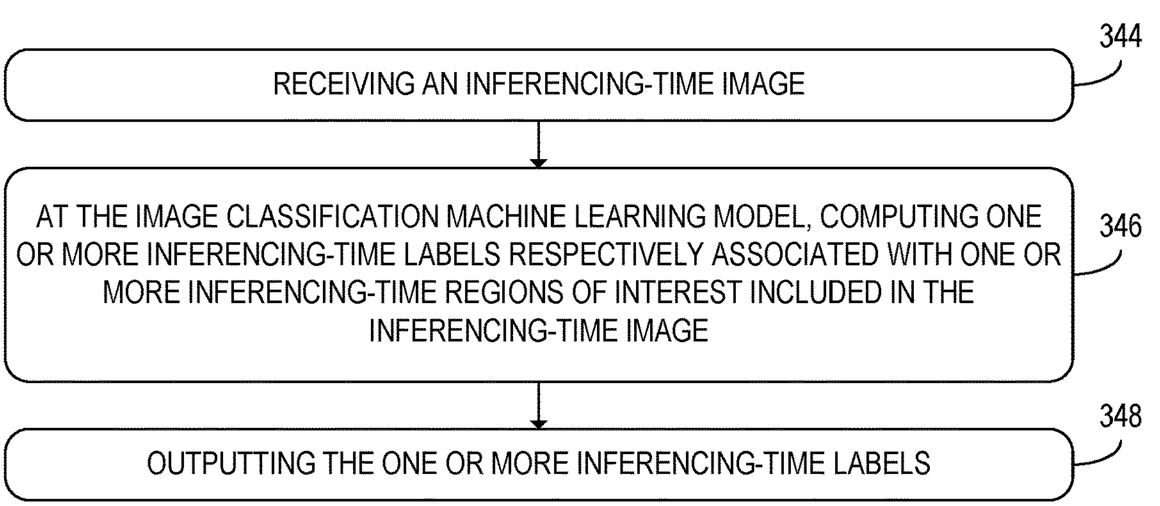
FIG. 9D shows additional steps of the method of FIG. 9A that are performed at inferencing time.

FIG. 9D shows additional steps of the method 300 that are performed at inferencing time. At step 344, the method 300 further includes receiving an inferencing-time image. At step 346, the method 300 further includes computing one or more inferencing-time labels at the image classification machine learning model. The one or more inferencing-time labels are respectively associated with one or more inferencing-time regions of interest included in the inferencing-time image. At step 348, the method 300 further includes outputting the one or more inferencing-time labels. For example, the inferencing-time labels can be output to a GUI that also shows the inferencing-time image and the one or more inferencing-time regions of interest of which the inferencing-time labels are assigned.

Using the devices and methods discussed above, a training data set for an image classification machine learning model is labeled in a manner that utilizes a smaller amount of expert annotation than typical methods of generating training data sets for image classifiers. Accordingly, the devices and methods discussed above allow for lower-cost training of image classifiers in domains for which large sets of labeled images are not already available.

In some embodiments, the methods and processes described herein are tied to a computing system of one or more computing devices. In such examples, such methods and processes are implemented as a computer-application program or service, an application-programming interface (API), a library, and/or other computer-program product.

Figure 10:
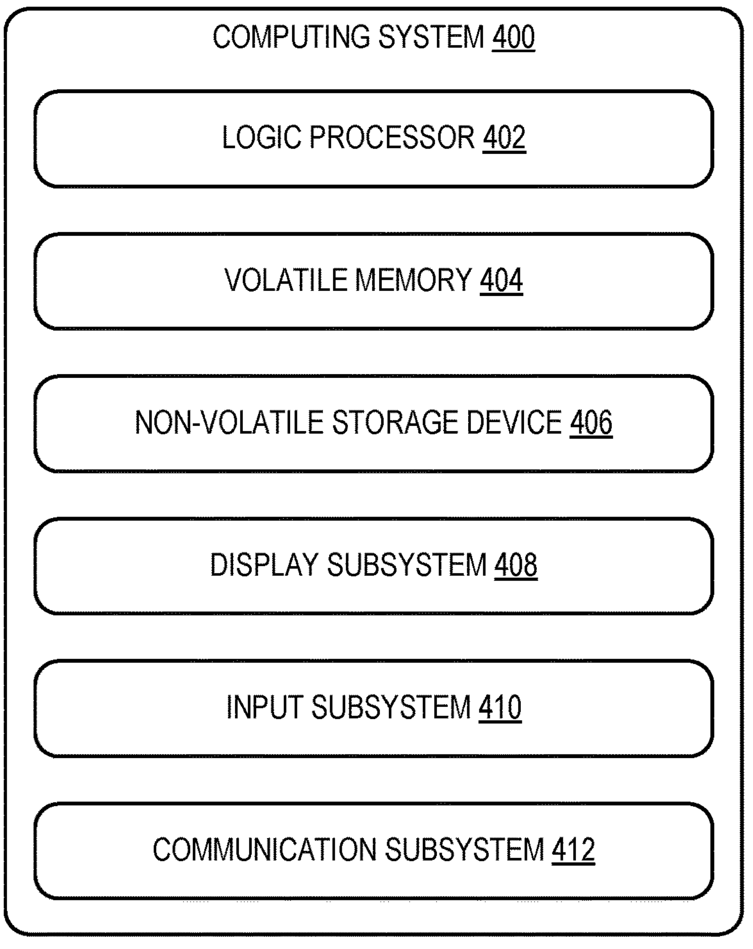
FIG. 10 schematically shows a computing environment in which the computing system is instantiated, according to the example of FIGS. 1A-1B.

FIG. 10 schematically shows a non-limiting embodiment of a computing system 400 that can enact one or more of the methods and processes described above. Computing system 400 is shown in simplified form. Computing system 400 can embody the computing system 10 described above and illustrated in FIG. 1. Components of computing system 400 are, for example, included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 optionally includes a display subsystem 408, input subsystem 410, communication subsystem 412, and/or other components not shown in FIG. 8.

Logic processor 402 includes one or more physical devices configured to execute instructions. For example, the logic processor 402 is configured to execute instructions that are part of one or more applications, programs, routines, libraries, objects, components, data structures, or other logical constructs. Such instructions are implemented to perform a task, implement a data type, transform the state of one or more components, achieve a technical effect, or otherwise arrive at a desired result.

The logic processor 402 includes one or more physical processors configured to execute software instructions. Additionally or alternatively, in some examples, the logic processor 402 includes one or more hardware logic circuits or firmware devices configured to execute hardware-implemented logic or firmware instructions. Processors of the logic processor 402 are single-core or multi-core, and the instructions executed thereon are configured for sequential, parallel, and/or distributed processing. Individual components of the logic processor 402 are optionally distributed among two or more separate devices, which in some examples are remotely located and/or configured for coordinated processing. In some examples, aspects of the logic processor 402 are virtualized and executed by remotely accessible, networked computing devices configured in a cloud-computing configuration. In such a case, these virtualized aspects are run on different physical logic processors of various different machines.

Non-volatile storage device 406 includes one or more physical devices configured to hold instructions executable by the logic processors to implement the methods and processes described herein. When such methods and processes are implemented, the state of non-volatile storage device 406 is transformed—e.g., to hold different data.

Non-volatile storage device 406 includes physical devices that are removable and/or built in. Non-volatile storage device 406 can include optical memory, semiconductor memory, and/or magnetic memory, or other mass storage device technology. Non-volatile storage device 406 can include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 includes physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 are, in some examples, integrated together into one or more hardware-logic components. Examples of such hardware-logic components include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" are used to describe an aspect of computing system 400 typically implemented in software by a processor to perform a particular function using portions of volatile memory, which involves transformative processing that specially configures the processor to perform the function. Thus, a module, program, or engine can be instantiated via logic processor 402 executing instructions held by non-volatile storage device 406, using portions of volatile memory 404. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

A display subsystem 408 is used in some examples to present a visual representation of data held by non-volatile storage device 406. The visual representation, for example, takes the form of a graphical user interface (GUI). In such examples, as the herein described methods and processes change the data held by the non-volatile storage device, and thus transform the state of the non-volatile storage device, the state of display subsystem 408 is likewise be transformed to visually represent changes in the underlying data. Display subsystem 408 includes one or more display devices utilizing virtually any type of display technology. In some examples, such display devices are combined with logic processor 402, volatile memory 404, and/or non-volatile storage device 406 in a shared enclosure. In other examples, such display devices are peripheral display devices.

When included, input subsystem 410 comprises or interfaces with one or more user-input devices such as a keyboard, mouse, touch screen, camera, or microphone.

When included, communication subsystem 412 is configured to communicatively couple various computing devices described herein with each other, and with other devices. Communication subsystem 412, for example, includes one or more wired and/or wireless communication devices compatible with one or more different communication protocols. As non-limiting examples, the communication subsystem is configured for communication via a wired or wireless local- or wide-area network, broadband cellular network, etc. In some embodiments, the communication subsystem allows computing system 400 to send and/or receive messages to and/or from other devices via a network such as the Internet.

Further, the disclosure comprises configurations according to the following clauses.

Clause 1. A computing system comprising: one or more processing devices configured to: receive a first labeled image set including a plurality of first images, wherein each of the first images includes one or more first identified regions of interest that have one or more respective first labels; receive an unlabeled image set including a plurality of second images without respective labels; identify a plurality of second identified regions of interest included in the plurality of second images; compute a respective feature similarity value between each of the second identified regions of interest and the plurality of first identified regions of interest; identify, in one or more of the second images, a subset of the plurality of the second identified regions of interest that have feature similarity values above a predetermined similarity threshold; apply respective second labels to the second identified regions of interest included in the subset; construct a second labeled image set including: the one or more second images that include the second identified regions of interest included in the subset; and the second labels; and train an image classification machine learning model with a training data set that includes the first labeled image set and the second labeled image set to thereby produce a trained image classification machine learning model.

Clause 2. The computing system according to Clause 1, wherein the first identified regions of interest include image data of: inkjet printing defects; rivets; cracks in objects; or additive manufacturing defects.

Clause 3. The computing system of Clause 1 or 2, wherein the one or more processing devices are further configured to: identify an additional subset of the plurality of second identified regions of interest that have respective feature similarity values below the predetermined similarity threshold; output an additional labeling request in response to determining that the feature similarity values are below the predetermined similarity threshold; subsequently to outputting the additional labeling request, receive a plurality of additional labels associated with an additional subset of the second identified regions of interest; and apply the plurality of additional labels to the second identified regions of interest included in the additional subset.

Clause 4. The computing system of any of Clauses 1-3, wherein the one or more processing devices are further configured to: during a testing phase, receive a plurality of test images; at the image classification machine learning model, compute a plurality of test labels respectively associated with a plurality of test regions of interest included in the test images; compute a model accuracy of the plurality of test labels; determine that the model accuracy is below a model accuracy threshold; output an additional labeling request in response to determining that the model accuracy is below the model accuracy threshold; and subsequently to outputting the additional labeling request, receive a plurality of additional labels associated with an additional subset of the second identified regions of interest.

Clause 5. The computing system of Clause 4, wherein the one or more processing devices are further configured to: compute a third labeled image set including: the plurality of second images that include the second identified regions of interest included in the additional subset; and the additional labels; and perform additional training at the image classification machine learning model using the third labeled image set.

Clause 6. The computing system of any of Clauses 1-5, wherein the one or more processing devices are further configured to: during a testing phase, receive a plurality of test images; at the image classification machine learning model, compute a plurality of test labels respectively associated with a plurality of test regions of interest included in the test images; compute a model accuracy of the plurality of test labels; determine that the model accuracy is below a model accuracy threshold; and in response to determining that the model accuracy is below the model accuracy threshold, modify a similarity metric with which the feature similarity values are computed.

Clause 7. The computing system of any of Clauses 1-6, wherein the one or more processing devices are further configured to: receive an inferencing-time image; at the image classification machine learning model, compute one or more inferencing-time labels respectively associated with one or more inferencing-time regions of interest included in the inferencing-time image; and output the one or more inferencing-time labels.

Clause 8. The computing system of any of Clauses 1-7, wherein the one or more processing devices are further configured to: compute a plurality of average representations of respective object classes indicated by the plurality of first labels; and compute the feature similarity values based at least in part on the average representations.

Clause 9. The computing system of any of Clauses 1-8, wherein the one or more processing devices are configured to identify the second identified regions of interest via scale-invariant feature transform (SIFT) extraction.

Clause 10. The computing system of any of Clauses 1-9, wherein the one or more processing devices are configured to: identify the second identified regions of interest using the image classification machine learning model; and iteratively re-select the second labeled image set and train the image classification machine learning model over a plurality of sampling iterations.

Clause 11. The computing system of Clause 10, wherein the one or more processing devices are configured to compute the feature similarity values at an image similarity neural network.

Clause 12. A method for use with a computing system, the method comprising: receiving a first labeled image set including a plurality of first images, wherein each of the first images includes one or more first identified regions of interest that have one or more respective first labels; receiving an unlabeled image set including a plurality of second images without respective labels; identifying a plurality of second identified regions of interest included in the plurality of second images; computing a respective feature similarity value between each of the second identified regions of interest and the plurality of first identified regions of interest; identifying, in one or more of the second images, a subset of the plurality of the second identified regions of interest that have feature similarity values above a predetermined similarity threshold; applying respective second labels to the second identified regions of interest included in the subset; constructing a second labeled image set including: the one or more second images that include the second identified regions of interest included in the subset; and the second labels; and training an image classification machine learning model with a training data set that includes the first labeled image set and the second labeled image set to thereby produce a trained image classification machine learning model.

Clause 13. The method of Clause 12, wherein the first identified regions of interest include image data of: inkjet printing defects; rivets; cracks in objects; or additive manufacturing defects.

Clause 14. The method of Clause 12 or 13, further comprising: identifying an additional subset of the plurality of second identified regions of interest that have respective feature similarity values below the predetermined similarity threshold; outputting an additional labeling request in response to determining that the feature similarity values are below the predetermined similarity threshold; subsequently to outputting the additional labeling request, receiving a plurality of additional labels associated with an additional subset of the second identified regions of interest; and applying the plurality of additional labels to the second identified regions of interest included in the additional subset.

Clause 15. The method of any of Clauses 12-14, further comprising: during a testing phase, receiving a plurality of test images; at the image classification machine learning model, computing a plurality of test labels respectively associated with a plurality of test regions of interest included in the test images; computing a model accuracy of the plurality of test labels; determining that the model accuracy is below a model accuracy threshold; outputting an additional labeling request in response to determining that the model accuracy is below the model accuracy threshold; and subsequently to outputting the additional labeling request, receiving a plurality of additional labels associated with an additional subset of the second identified regions of interest.

Clause 16. The method of Clause 15, further comprising: computing a third labeled image set including: the plurality of second images that include the second identified regions of interest included in the additional subset; and the additional labels; and performing additional training at the image classification machine learning model using the third labeled image set.

Clause 17. The method of any of Clauses 12-15, further comprising: during a testing phase, receiving a plurality of test images; at the image classification machine learning model, computing a plurality of test labels respectively associated with a plurality of test regions of interest included in the test images; computing a model accuracy of the plurality of test labels; determining that the model accuracy is below a model accuracy threshold; and in response to determining that the model accuracy is below the model accuracy threshold, modifying a similarity metric with which the feature similarity values are computed.

Clause 18. The method of any of Clauses 12-17, further comprising: receiving an inferencing-time image; at the image classification machine learning model, computing one or more inferencing-time labels respectively associated with one or more inferencing-time regions of interest included in the inferencing-time image; and outputting the one or more inferencing-time labels.

Clause 19. The method of any of Clauses 12-18, further comprising identifying the second identified regions of interest using the image classification machine learning model.

Clause 20. A computing system comprising: one or more processing devices configured to: train an image classification machine learning model using a training data set that includes: a plurality of first labeled images that each include one or more first identified regions of interest with one or more respective first labels, wherein the first labeled images are received in one or more markup iterations; and a plurality of second labeled images that each include one or more second identified regions of interest with one or more respective second labels, wherein the second labels are applied to the second identified regions of interest based at least in part on respective feature similarity values between each of the second identified regions of interest and the plurality of first identified regions of interest; receive an inferencing-time image; at the image classification machine learning model, compute one or more inferencing-time labels respectively associated with one or more inferencing-time regions of interest included in the inferencing-time image; and output the one or more inferencing-time labels.

"And/or" as used herein is defined as the inclusive or V, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein represent one or more of any number of processing strategies. As such, various acts illustrated and/or described are performable in the sequence illustrated and/or described, in other sequences, in parallel, or omitted. Likewise, the order of the above-described processes can be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:

one or more processing devices configured to:

receive a first labeled image set including a plurality of first images, wherein each of the first images includes one or more first identified regions of interest that have one or more respective first labels;

receive an unlabeled image set including a plurality of second images without respective labels;

identify a plurality of second identified regions of interest included in the plurality of second images;

compute a respective feature similarity value between each of the second identified regions of interest and the plurality of first identified regions of interest;

identify, in one or more of the second images, a subset of the plurality of the second identified regions of interest that have feature similarity values above a predetermined similarity threshold;

apply respective second labels to the second identified regions of interest included in the subset;

construct a second labeled image set including:

the one or more second images that include the second identified regions of interest included in the subset; and the second labels;

train an image classification machine learning model with a training data set that includes the first labeled image set and the second labeled image set to thereby produce a trained image classification machine learning model;

during a testing phase, receive a plurality of test images;

at the image classification machine learning model, compute a plurality of test labels respectively associated with a plurality of test regions of interest included in the test images;

compute a model accuracy of the plurality of test labels;

determine that the model accuracy is below a model accuracy threshold; and in response to determining that the model accuracy is below the model accuracy threshold, modify a similarity metric with which the feature similarity values are computed.

2. The computing system of claim 1, wherein the first identified regions of interest include image data of:

inkjet printing defects;

rivets;

cracks in objects; or additive manufacturing defects.

3. The computing system of claim 1, wherein the one or more processing devices are further configured to:

identify an additional subset of the plurality of second identified regions of interest that have respective feature similarity values below the predetermined similarity threshold;

output an additional labeling request in response to determining that the feature similarity values are below the predetermined similarity threshold;

subsequently to outputting the additional labeling request, receive a plurality of additional labels associated with the additional subset of the second identified regions of interest; and apply the plurality of additional labels to the second identified regions of interest included in the additional subset.

4. The computing system of claim 1, wherein the one or more processing devices are further configured to:

output an additional labeling request in response to determining that the model accuracy is below the model accuracy threshold; and subsequently to outputting the additional labeling request, receive a plurality of additional labels associated with an additional subset of the second identified regions of interest.

5. The computing system of claim 4, wherein the one or more processing devices are further configured to:

compute a third labeled image set including:

the plurality of second images that include the second identified regions of interest included in the additional subset; and the additional labels; and perform additional training at the image classification machine learning model using the third labeled image set.

6. The computing system of claim 1, wherein the one or more processing devices are further configured to:

receive an inferencing-time image;

at the image classification machine learning model, compute one or more inferencing-time labels respectively associated with one or more inferencing-time regions of interest included in the inferencing-time image; and output the one or more inferencing-time labels.

7. The computing system of claim 1, wherein the one or more processing devices are further configured to:

compute a plurality of average representations of respective object classes indicated by the plurality of first labels; and compute the feature similarity values based at least in part on the average representations.

8. The computing system of claim 1, wherein the one or more processing devices are configured to identify the second identified regions of interest via scale-invariant feature transform (SIFT) extraction.

9. The computing system of claim 1, wherein the one or more processing devices are configured to:

identify the second identified regions of interest using the image classification machine learning model; and iteratively re-select the second labeled image set and train the image classification machine learning model over a plurality of sampling iterations.

10. The computing system of claim 9, wherein the one or more processing devices are configured to compute the feature similarity values at an image similarity neural network.

11. A method for use with a computing system, the method comprising:

receiving a first labeled image set including a plurality of first images, wherein each of the first images includes one or more first identified regions of interest that have one or more respective first labels;

receiving an unlabeled image set including a plurality of second images without respective labels;

identifying a plurality of second identified regions of interest included in the plurality of second images;

computing a respective feature similarity value between each of the second identified regions of interest and the plurality of first identified regions of interest;

identifying, in one or more of the second images, a subset of the plurality of the second identified regions of interest that have feature similarity values above a predetermined similarity threshold;

applying respective second labels to the second identified regions of interest included in the subset;

constructing a second labeled image set including:

the one or more second images that include the second identified regions of interest included in the subset; and the second labels;

training an image classification machine learning model with a training data set that includes the first labeled image set and the second labeled image set to thereby produce a trained image classification machine learning model;

during a testing phase, receiving a plurality of test images;

at the image classification machine learning model, computing a plurality of test labels respectively associated with a plurality of test regions of interest included in the test images;

computing a model accuracy of the plurality of test labels;

determining that the model accuracy is below a model accuracy threshold; and in response to determining that the model accuracy is below the model accuracy threshold, modifying a similarity metric with which the feature similarity values are computed.

12. The method of claim 11, wherein the first identified regions of interest include image data of:

inkjet printing defects;

rivets;

cracks in objects; or additive manufacturing defects.

13. The method of claim 11, further comprising:

identifying an additional subset of the plurality of second identified regions of interest that have respective feature similarity values below the predetermined similarity threshold;

outputting an additional labeling request in response to determining that the feature similarity values are below the predetermined similarity threshold;

subsequently to outputting the additional labeling request, receiving a plurality of additional labels associated with the additional subset of the second identified regions of interest; and applying the plurality of additional labels to the second identified regions of interest included in the additional subset.

14. The method of claim 11, further comprising:

outputting an additional labeling request in response to determining that the model accuracy is below the model accuracy threshold; and subsequently to outputting the additional labeling request, receiving a plurality of additional labels associated with an additional subset of the second identified regions of interest.

15. The method of claim 14, further comprising:

computing a third labeled image set including:

the plurality of second images that include the second identified regions of interest included in the additional subset; and the additional labels; and performing additional training at the image classification machine learning model using the third labeled image set.

16. The method of claim 11, further comprising:

receiving an inferencing-time image;

at the image classification machine learning model, computing one or more inferencing-time labels respectively associated with one or more inferencing-time regions of interest included in the inferencing-time image; and outputting the one or more inferencing-time labels.

17. The method of claim 11, further comprising identifying the second identified regions of interest using the image classification machine learning model.

18. A computing system comprising:

one or more processing devices configured to:

train an image classification machine learning model using a training data set that includes:

a plurality of first labeled images that each include one or more first identified regions of interest with one or more respective first labels, wherein the first labeled images are received in one or more markup iterations; and a plurality of second labeled images that each include one or more second identified regions of interest with one or more respective second labels, wherein the second labels are applied to the second identified regions of interest based at least in part on respective feature similarity values between each of the second identified regions of interest and the plurality of first identified regions of interest;

during a testing phase, receive a plurality of test images;

at the image classification machine learning model, compute a plurality of test labels respectively associated with a plurality of test regions of interest included in the test images;

compute a model accuracy of the plurality of test labels;

determine that the model accuracy is below a model accuracy threshold;

in response to determining that the model accuracy is below the model accuracy threshold, modify a similarity metric with which the feature similarity values are computed;

receive an inferencing-time image;

at the image classification machine learning model, compute one or more inferencing-time labels respectively associated with one or more inferencing-time regions of interest included in the inferencing-time image; and output the one or more inferencing-time labels.

19. The computing system of claim 18, wherein the first identified regions of interest include image data of:

inkjet printing defects;

rivets;

cracks in objects; or additive manufacturing defects.

20. The computing system of claim 18, wherein the one or more processing devices are further configured to:

compute a plurality of average representations of respective object classes indicated by the plurality of first labels; and compute the feature similarity values based at least in part on the average representations.

* * * * *